INVENTOR
HARLEY E. HOLT
and
GEORGE R. QUICK

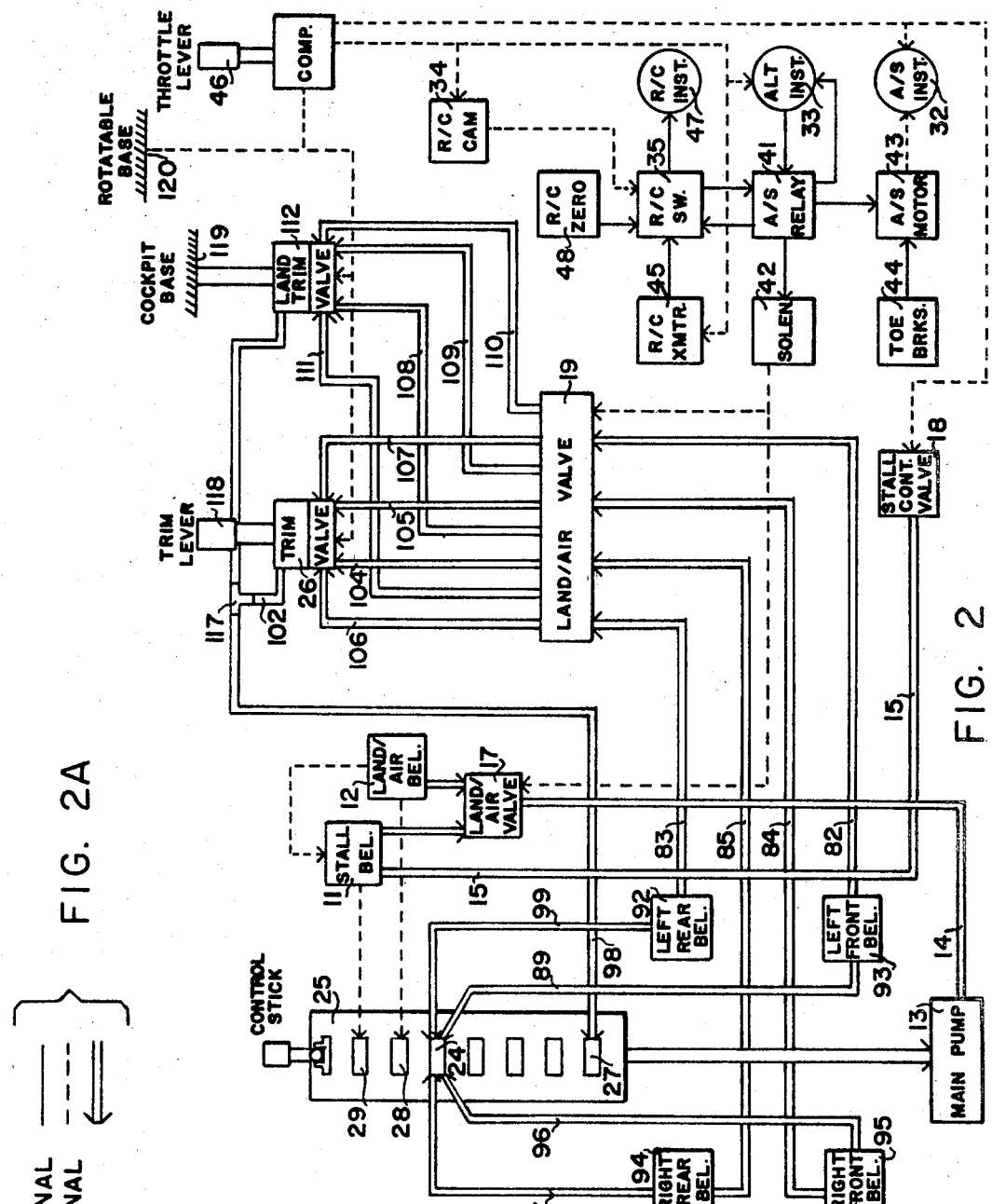

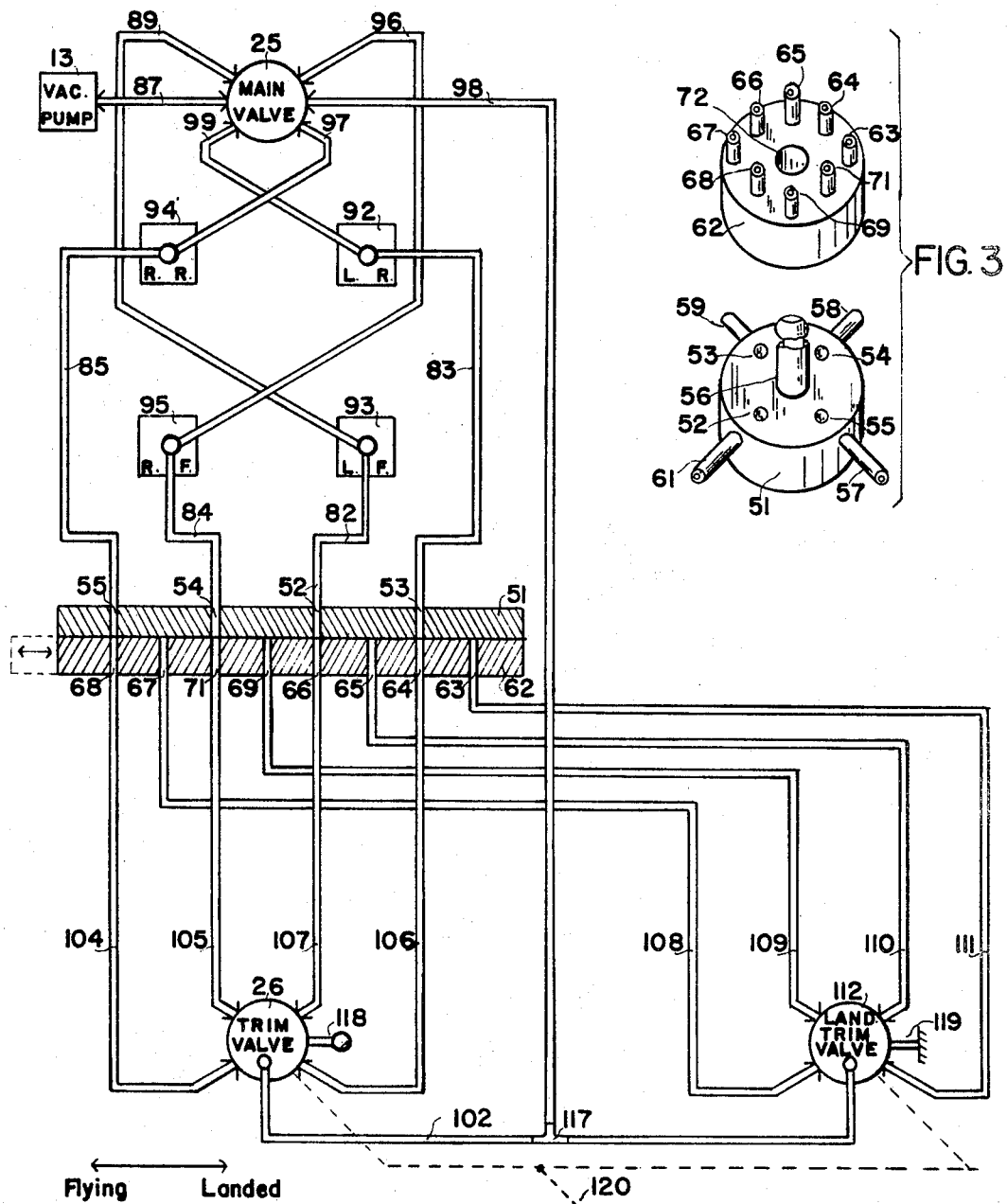

INVENTOR
HARLEY E. HOLT
and GEORGE R. QUICK

United States Patent Office 3,451,145
Patented June 24, 1969

---

3,451,145
CONTROLS FOR AVIATION TRAINERS
Harley E. Holt, Arlington, Va., and George R. Quick, Silver Spring, Md., assignors to Singer-General Precision, Inc., Binghamton, N.Y., a corporation of Delaware
Filed Dec. 1, 1966, Ser. No. 598,368
Int. Cl. G09b 9/08
U.S. Cl. 35—12                                3 Claims

ABSTRACT OF THE DISCLOSURE

In prior art motion systems for simulated aircraft, fluid pressures and vacuums have been used to produce the desired motion. Some of these systems have been unable to perform some functions which can be considered necessary. This invention modifies a popular fluid system for producing motion in aircraft trainers to provide that system with the automatic landing capability that the system did not have before.

---

This invention relates to aviation trainers and, more particularly, to the effective control of such trainers to more realistically simulate the flight of aircraft.

As shown in the patent to Hayes and Herskovits, 2,514,762, some aircraft simulators utilize a system of expansible motors operated by differences in fluid pressure to give, to a universally mounted simulated trainer cockpit, motion which approximates that of an aircraft in flight. The application of fluid pressure, or vacuum as in the case of the patented system, to the individual expansible motor to cause the cockpit to move in the desired direction is controlled by a main valve operated by the control stick in the cockpit. One of the primary disadvantages of the system disclosed in the patent is the inability of the simulator to properly simulate landings and takeoffs. In the Hayes et al. device, the trainee normally would be coming in for a landing at a negative angle of attack, the altimeter would be showing a descent, and the rate-of-climb indicator would indicate a negative climb when the altimeter passed through zero and the simulated craft presumably hit the ground. This invention provides an improvement to the Hayes et al. system to level the simulated aircraft to a zero rate-of-climb when the altimeter reaches zero and the simulated aircraft lands, and to revert to the positive rate-of-climb indication on subsequent takeoffs.

It is an object of this invention to provide a new and improved fixed-base aircraft trainer.

It is another object of this invention to provide a new and improved fixed-base aircraft trainer which more realistically simulates the operation of aircraft in flight.

It is a further object of this invention to provide a new and improved flight simulator with improved controls and instrumentation to simulate the takeoff and landing of an aircraft.

Other objects and advantages of this invention will become apparent as the following description proceeds, which description should be considered together with the accompanying drawings in which:

FIG. 2 is a block diagram of the controls for the simulator of FIG. 1;

FIG. 2A is a legend for the diagram of FIG. 2;

FIG. 3 is an exploded perspective view of a control valve used in the system of FIG. 2;

FIG. 4 is a block diagram of some of the controls associated with landing the simulated aircraft.

Figure 1:
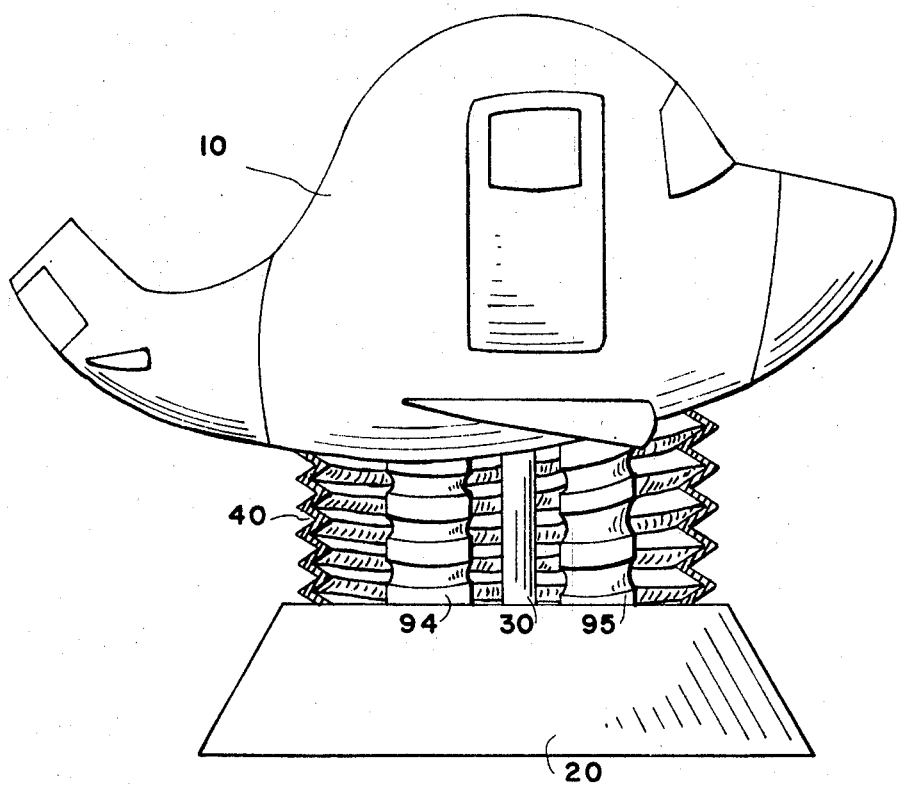
FIG. 1 is a pictorial showing, partially in section, of a typical fixed-base aircraft simulator.

Referring now to the drawings in detail, and more particularly to FIG. 1, a cockpit 10 which represents, in configuration only, an actual aircraft is mounted by means of a universal joint (not shown) on a shaft 30. The shaft 30 is supported by means of a base 20 through which it, at least partially, passes. Also shown supported on the base 20 are bellows 94 and 95, two of four bellows which control the attitude of the cockpit 10 at any time. The bellows 94 and 95 are examples of one type of expansible motor. A hydraulic cylinder is another. A corrugated flexible shroud 40 surrounds the bellows 94 and 95 and the shaft 30 to present a pleasing appearance.

In operation, the cockpit 10 is large enough to contain a student. The cockpit 10 may include small versions of wings, tail assembly, and other external attributes of a modern airplane, or it may comprise little more than a housing to comfortably hold the student. Controls for operating an aircraft are contained in the cockpit 10, and when the controls are suitably manipulated by the student, the cockpit 10 is caused to move by means of the bellows such as 94 and 95. When the bellows 94 is evacuated, the nose of the cockpit 10 rises and the student has the impression of climbing. When the bellows 95 is evacuated, the nose of the cockpit drops, and the student has the impression of descending. Also, when both of the bellows 94 and 95 are evacuated together and by the same amount, the cockpit 10 rolls. Thus, substantial cockpit motion can be achieved in the trainer simulator of FIG. 1 by evacuating the bellows in pairs. The shroud 40 must be very flexible and capable of expanding and compressing a substantial amount to accommodate the movements of the cockpit 10. In addition, the shaft 30 may be rotatably mounted, and the entire cockpit 10 may be capable of rotation to simulate turning.

The control system for controlling the cockpit motion is shown in FIG. 2. A main vacuum pump 13 is connected directly to the main control valve 25 which is shown with seven leaves and a control cap connected to a control stick. The four bellows 92, 93, 94 and 95, which control the attitude of the cockpit 10, are mounted respectively under the cockpit at the left rear, the left front, the right rear and the right front. The bellows 92–95 are connected to the leaf 24 in the main valve 25 by means of vacuum lines 99, 89, 97 and 96 respectively. In addition, the bellows 92–95 are connected to one side of a land/air valve 19 by means of vacuum lines 83, 82, 85 and 84, respectively. The other side of the land/air valve 19 has eight ports. Four ports are connected to a trim valve 26 by means of lines 106, 107, 104 and 105, and the other four, alternate, ports are connected to a landing trim valve 112 by means of lines 111, 110, 108 and 109. The trim valve 26 has a trim lever which is used to manually adjust the valve, but the landing trim valve 112 is connected to a cockpit frame of reference in a fixed position. One of the leaves 27 of the main control valve 25 is connected by means of a line 98 to the landing trim valve 112 and through a T 117 and a line 102 to the trim valve 26. In addition to its connection to the main valve 25, the main vacuum pump 13 is connected by means of a line 14 to a land/air valve 17, and this land/air valve 17 is connected to a stall actuator bellows 11 and to a landing actuator bellows 12. The stall actuator bellows 11 is also connected by means of a line 15 to a stall control valve 18.

In addition to the fluid systems mentioned above, there are mechanically and electrically interconnected controls in the cockpit 10. A throttle lever 46 is mechanically connected to a computer 31. A lever 120 is also connected from the base 20 (FIG. 1) to the input of the computer 31 and, in addition, is mechanically connected to the trim valve 26 and the landing trim valve 112. The outputs of the computer 31 are mechanical actions which are applied to a rate-of-climb cam 34, to an altimeter instrument 33, to a rate-of-climb transmitter 45, to the air speed instrument 32, and to the stall control valve 18. A mechanical output from the rate-of-climb cam 34 is applied to a rate-of-climb switch 35 which applies an electrical signal to a rate-of-climb transmitter 45 and a rate-of-climb zero actuator 48. The altimeter instrument 33 supplies an electrical signal to the altimeter relay 41 which generates electrical signals to be applied back to the altimeter instrument 33, to an altimeter solenoid 42 and to an air speed motor 43. The solenoid 42 applies mechanical signals to the land/air valve 17 and to the larger land/air valve 19. Applied to the air speed instrument 32 is an additional mechanical input from the air speed motor 43 which also receives an electrical input from the toe brakes 44.

In operation, the main control valve 25 is operated by means of the control stick to control the attitude of the cockpit 10 in a manner more fully explained in the aforementioned Patent No. 2,514,762 to Hayes et al. As the control stick is moved, it connects two of the bellows 92–95 more or less directly to the main pump 13. When all of the bellows 92–95 are connected by equal amounts to the main pump 13, the cockpit 10 is level. When, however, the control stick is moved so that one pair or another of the bellows 92–95 are connected by greater amounts to the main pump 13 than the other pair, the cockpit 10 assumes a different attitude. This is more fully explained in the mentioned patent to Hayes et al. In normal simulated flights, the control stick is operated to bring the cockpit up to what is considered to be a flight altitude, and then the trim lever, which is connected to the trim valve 26, is moved to place the cockpit in the proper attitude for normal flight. When the trim lever is moved, it adjusts the amount of vacuum applied from the main pump 13 through the leaf 27 and the line 98 to the individual bellows 92–95. Once the trim lever has been adjusted so that the cockpit is in the proper attitude, it remains there until the controls are changed. This permits further control of the cockpit by the use of the control stick and the main valve 25. Thus, not only does the main control valve 25 serve to determine the amount of vacuum being pulled on the bellows 92–95, but so does the position of the trim valve 26. The pitch position lever 120 supplies a mechanical feedback to the computer 31 and trim valve 26 so that the computer and trim valve always have an indication of cockpit pitch position with respect to the fixed base. These two inputs produce, in the output of the computer 31, mechanical signals which are applied, for example, to the rate-of-climb cam 34. This is further controlled by the rate-of-climb transmitter 45 which receives its input from the computer 31. The rate-of-climb cam 34 controls the setting of the rate-of-climb indicator 47. As time passes, the altimeter instrument 33 is driven at a rate determined by the rate-of-climb to display the altitude at which the cockpit 10 is supposed to be cruising. The rate-of-climb switch 35 and the throttle setting together operate to drive the altimeter instrument 33 so that it displays the correct altitude. The throttle setting also controls the air speed instrument 32 which is driven by the air speed motor 43. When the rate-of-climb of the cockpit 10 increases to a point where the thrust of the engine as indicated by the setting of the throttle lever 45 is too low, the cockpit reaches a stall condition. This is created by the operation of the stall control valve 18 which is placed in the proper position by the output of the computer 31, to which is fed the pitch position from the pitch position lever 120 and the engine thrust from the throttle lever 46 as explained in the patent to Hayes et al. Operation of the stall control valve 18 permits air to be dumped into the stall bellows 11 causing it to operate and actuate the stall leaf 29 in the main control valve 25.

With the operation mentioned above, a training mission can be flown in the cockpit 10, but when the student is descending to come in for a landing, it is still possible to fly the cockpit 10 into a simulated ground. This occurs when the altimeter instrument 33 indicates zero altitude. Therefore, the altimeter relay 41 has been added to this system so that when the altimeter instrument 33 approaches a zero condition, the altimeter relay 41 is actuated, applying an electrical signal to the solenoid 42. The solenoid 42 operates and applies mechanical signals to the land/air valve 17 and to the land/air valve 19. The land/air valve 17 is operated to cause the land/air bellows 12 to operate. This applies a mechanical signal to both the stall bellows 11 and a leaf 28 in the main control valve 25. The signals applied to the stall bellows 11 and ot the leaf 28 cause the leaf 28 to rotate and to carry with it the leaf 29 which is the stall leaf. The rotation of these two leaves 28 and 29 effectively renders the control stick inoperative. This is explained with reference to FIG. 5. In addition, the four bellows 92–95 are connected in substantially the same amounts to the main pump 13. To overcome the affect of the trim valve 26 which could still modify the attitude, the land/air valve 19 is operated by the solenoid 42 (or, as shown in FIG. 2, it is slid sideways) so that the lines 82–85 which connect the land/air valve 19 with the four bellows 92–95 are changed from their connections through the lines 104–107 to the trim valve 26 to having through-connections with the lines 108–111 to the landing trim valve 112. Whereas the trim valve 26 is adjustable by the operator, the landing trim valve 112 is locked in a position corresponding to a level condition. As this valve is brought into action, it immediately causes the cockpit to be moved to the level position. The amount of this movement is determined by the actual pitch attitude at the moment of touchdown (a steep angle of approach will cause a greater angular displacement than will occur if the student "flares out" on his approach immediately preceeding touchdown). From this it can be seen that operation of the stall bellows 11 and the land/air bellows 12 rendered the main control valve 25 ineffective to control the attitude of the cockpit 10, and the operation of the land/air valve 19 bypassed the trim valve 26 and substtituted therefore the trim valve 112 to level the cockpit. Thus, as the altitude of the cockpit 10 reaches zero, it is leveled as it would be for a true landing.

In addition, to simulate landing conditions, the rate-of-climb instrument 47 must also indicate zero rate of climb. This is accomplished by the electrical signal from the altimeter relay 41 applied to the rate-of-climb switch 35 to cause the rate-of-climb instrument 47 to be restored to zero.

In the takeoff operation, the simulator cockpit remains level until a preselected airspeed is reached. At this time the altimeter 33 and the rate-of-climb indiactor 47 are both at zero. As the speed is increased, and the speed at this point is controlled only by the throttle setting of the computer, the altimater relay 41 is actuated by a signal from the altimeter. The altimeter relay triggers the solenoid 42 to shift the position of the land/air valves 17 and 19. This causes the vacuum to be dumped to the atmosphere from the land/air bellows 12 which rotates the leaves 28 and 29 in the main valve 25. At the same time, vacuum supplied to the main bellows 92–95 through the landing trim valve is switched to the trim valve 26. The stick and pitch levers can now be operated to control the attitude of the cockpit. The altimeter relay 41 also controls the power to the rate-of-climb switch 35 and the rate-of-climb cam 34 actuates the switch between the altimeter zero and the altimeter transmitter so that as the pitch attitude is modified by the control stick position to produce takeoff of the simulator, the rate-of-climb instrument 47 will show a vertical speed proportional to the air speed and pitch attitude.

To accomplish these results, a new land/air valve 19 was constructed. One embodiment of this valve is shown in FIG. 3 and its operation will be shown with reference to FIG. 4. The embodiment of the land/air valve shown in FIG. 3 comprises two, generally cylindrical, portions 51 and 62. The bottom portion 51 can be considered a stationary member, and it comprises a solid block of suitable material, such as metal plastic or the like. A centrally located projection 56 extends upwardly from one of its surfaces to form a pivot. The fixed member 51 has formed through its top surface four equally spaced holes 52, 53, 54 and 55. The holes 52–55 extend only part way through the lower portion 51 and radial holes are formed in the lower portion 51 to communicate with the holes 52–55. Nipples 61, 59, 58 and 57 are secured in the radial holes so that the appropirate air lines may be attached thereto. The upper portion 62 also comprises a generally cylindrical solid member having a central perforation 72 of such size as to properly fit over the spindle 56 so that the upper portion 62 is readily rotatable thereon. A split washer, not shown, may be placed in the groove formed in the top part of the spindle 56 to secure the upper member 62 properly in place. The upper member 62 has eight generally equally spaced perforations which pass completely through the member in parallel with its longitudinal axis. At any time, four of the perforations in the upper member 62 are aligned with four of the holes in the lower member 51. Nipples 63, 64, 65, 66, 67, 68, 69 and 71 are attached to the upper member and to the holes therein so that suitable air lines may be secured thereto. The operation of the land/air valve shown in FIG. 3 can more easily be understood by reference to FIG. 4.

In FIG. 4, the land/air valve is shown as an elongated valve which slides rather than rotates. But the principle of operation is the same. The lower member 51 of FIG. 3 is shown in FIG. 4 as the upper member 51 and the upper member 62 of FIG. 3 is shown in FIG. 4 as the lower member 62. At any rate, it is still the member 62 which moves and this movement is shown in FIG. 4 by the dashed lines. The axial perforations through the member 62 pass completely through that member. These are indicated by the reference characters 62–71. The stationary member 51, however is shown in FIG. 4 having straight-through perforations 52–55 rather than L-shaped perforations therethrough. The perforation 52 is connected by means of a line 82 to the bellows 93; the perforation 53 is connected by a line 83 to the bellows 92; the perforation 54 is connected by a line 84 to the bellows 95; and the perforation 55 is connected by a line 85 to the bellows 94. A line 98 runs from the main valve 25 through a T 117 and a line 102 to the trim valve 26 and to the landing trim valve 112. Thus, the main vaccum pump 13 is connected by a line 87 through the main valve 25, the line 98, and the line 102 to the trim valve 26 and through the lines 104, 105, 106 and 107 to four of the perforations in the member 62. The vacuum pump 13 is connected by the same line 87 through the main valve 25, through line 98 and tee 117 to the landing trim valve 112, also. And lines 108, 109, 110 and 111 from the landing trim valve 12 are connected to the other four throughholes 67, 69, 65 and 63.

In normal operation, the trim valve 26 is connected through its four lines 104, 105, 106 and 107 by means of the perforations 68, 71, 64 and 66 in the member 62 to the perforations 55, 54, 53 and 52 in the member 51 and, thereby, to the bellows 94, 95, 92 and 93. When the land/air valve is operated, the member 62 is moved toward the left into the position shown in dashed lines. This now aligns the hole 55 in the member 51 with the hole 67 in the member 62; and the hole 54 in the member 51 with the hole 69 in the member 62; and the hole 52 in the member 51 with the hole 65 in the member 62; and the hole 53 in the member 51 with the hole 63 in the member 62. This effectively connects the landing trim valve 112 to the bellows 92–95 rather than the trim valve 26. In the embodiment shown in FIG. 3, the member 62 is rotated on the spindle 56 through an angle of approximately 45 degrees to cause the same effect.

Figure 5:
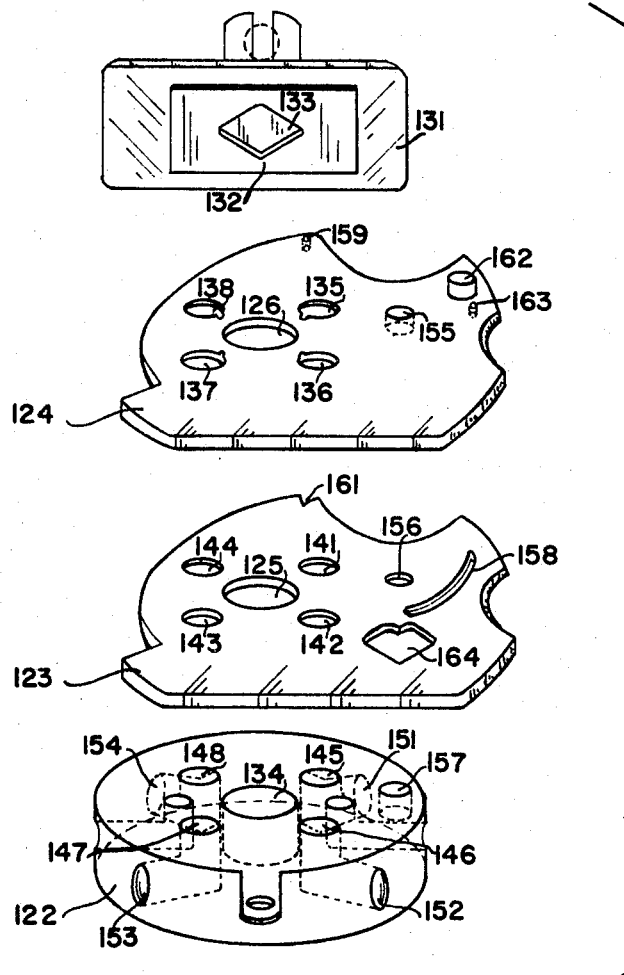
FIG. 5 is an exploded view of a portion of the main control valve of the simulated aircraft.

In the above description, the main control valve 25 was referred to many times. As mentioned earlier, this control valve is disclosed in detail in the patent to Hayes et al. However, at least a portion of the main valve 25 has been modified for this invention so that when the trainer is landed, the control stick becomes inoperative to modify the pitch of the cockpit. For purposes of maintaining simplicity in the drawings and description, only a portion of the main valve 25 is shown in FIG. 5. In FIG 2, the main valve 25 was shown schematically comprising seven leaves and a cover; in FIG. 5, only three of these leaves and the cover are shown. In addition, some of the leaves have been simplified and not all of their operative features are shown in FIG. 5 to eliminate unnecessary description for this discussion. The bottom leaf 122 shown in FIG. 5 is a fairly thick leaf and is normally maintained stationary in the main valve 25. It has a large central perforation 134 extending axially through the leaf 122. By means not shown in FIG. 5, the bottom of this axial perforation 134 is connected to the main vacuum pump 13. It should be mentioned at this point that all further references to the orientation of the leaves of this valve will be made with respect to FIG. 5. The landing leaf 123 is positioned immediately above the stationary leaf 122 and it also contains a large axial perforation 125. Positioned above the landing leaf 123 is the stall leaf 124 which also includes a large axial perforation 126. The large axial perforations 134, 125 and 126 are designed to lie coaxially with each other so that the connection to the main vacuum pump 13 is passed through the top of the landing leaf 124. The cover 131 has a raised flat portion 132 with a generally central depression 133 formed therein. Additionally, the three leaves 122, 123 and 124 have four equally spaced bellows perforations 135, 136, 137 and 138 in leaf 124; 141, 142, 143 and 144 in leaf 123; and 145, 146, 147 and 148 partially through leaf 122. These perforations 135–138, 141–144 and 145–148 are arranged around the large perforations 126, 125 and 134 so that corresponding perforations in the three leaves 122, 123 and 124 are aligned. The depression 133 in the cap 131, when it is centrally positioned over the large perforation 126, also covers a substantial portion of each of the four other bellows perforations 135, 136, 137 and 138. In the stationary leaf 122, the four disposed bellows perforations 145, 146, 147 and 148 extend only partially through the leaf and are joined by radial holes 151, 152, 153 and 154 respectively to form L-shaped holes through the body of the leaf 122. In this manner, nipples may be attached to the leaf 122 in line with the radial openings 151, 152, 153 and 154 so that they may be connected by appropriate lines to the individual bellows 92–95. Considering what has been described so far, when the three leaves and the cover are placed properly in position one on top of the other, the main vacuum pump 13 is connected through the perforations 134, 125 and 126 to the depression 133 in the cover 131 which permits this connection to also be applied to the four bellows 92–95 through the holes 135–138, 141–144, 145–148, radial openings 151–154 and the appropriate lines. In a normal rest position these corresponding holes are aligned and the cap 131 is centrally located so that the vacuum from the main pump 13 is equally applied to all of the four bellows 92–95. When the cap 131 is moved one way or another, one or another pair of the openings 135—135 is exposed to a greater extent to the vacuum from the pump 13 while another pair of these openings is exposed thereto to a lesser extent. This causes a greater evacuation of one pair of bellows or another to produce a desired motion of the cockpit 10.

Since, in normal operation of the trainer, a descent condition is produced by movement of the control stick and the cap 131, if the cockpit 10 is to automatically land, then this control by the control stick must be eliminated. The elimination of this control is achieved by the addition of the land leaf 123 to the main valve 25 as it was shown in the Hayes et al. patent. In normal flight, the stall leaf 124 may be actuated alone to create a stall condition. However, when the cockpit 10 is to simulate a landing, the landing leaf 123 is rotated together with the stall leaf 124. A pin 155 extends downwardly from the bottom surface of the stall leaf 124 through an opening 156 in the landing leaf 123 and into an opening 157 in the stationary leaf 122. In addition, a curved slot 158 is formed in the landing leaf 123 to accommodate a small pin 163 which depends from the bottom of the stall leaf 124. The two leaves 123 and 124 may therefore rotate together or individually on the pin 155 which is seated in the hole 156. An additional pin 159 depends from one portion of the stall leaf 124 and fits into a notch 161 formed in the landing leaf 123. A pin 162 which extends upwardly from the stall leaf 124 is connected by a push rod (not shown) which is connected at its other end to the stall bellows 11 shown in FIG. 2. When the stall bellows 11 is actuated and when the land/air bellows 12 is also actuated, the stall and landing leaves 123 and 124 are rotated in a clockwise direction until the pin 163, which extends beyond the bottom side of the bottom leaf 123, strikes the side of the stationary leaf 122. This brings a generally rectangular opening 164 formed in the landing leaf 123 over the central opening 134, and to a very small extent over each of the openings 145–148. Immediately over the rectangular perforation 164 is a solid portion of the stall leaf 124 so that this action effectively blocks off the connections from the vacuum pump 13 and the bellows 92–95 from the cap 131, while connecting these connections together through the perforation 164. The connection made by the perforation 164 between the vacuum pump 13 and all of the bellows 92–95 is approximately the same and permits the bellows to expand an equal amount and level the cockpit 10. The interposition of the solid portion of the stall leaf 124 between the perforations in the stationary leaf 122 and the cap 131 renders the control stick inoperative until the stall and land/air bellows 11 and 12 are actuated to withdraw the two leaves 123 and 124.

The above specification has disclosed in detail a new and improved control system for fixed-base aircraft trainers. It is realized that the above description will indicate to others in the field additional ways in which the principles of this invention may be used without departing from its spirit. It is, therefore, intended that this invention be limited only by the scope of the appended claims.

What is claimed is:

1. A control system for a fixed-base trainer having means for simulating motion, said trainer including expansible motor means for controlling the attitude of the trainer at any time, a source of fluid pressure variations, and a main control valve by which said source is connected to said expansible motors, said system comprising a device for simulating altitude during trainer operation, a first switch means connected to said device for generating an electrical signal when said device indicates zero altitude, a relay actuated by said electrical signal, a solenoid connected to said relay to be energized thereby when the relay is actuated, a first valve having one side connected to said source and another side connected to an actuating bellows, said first valve connecting said source to said actuating bellows by said solenoid, means in said main control valve actuated by the operation of said actuating bellows to render said main control valve inoperative and for causing said main control valve to apply equal fluid pressure to all of said attitude expansible motors, a first trim valve and a second trim valve, said first and second trim valves being connected on one side to said source, a two position land-air valve connected by separate fluid lines to individual expansible motor means on one side and on the other side in a first position by individual fluid lines to the other side of said first trim valve and in a second position by individual fluid lines to the other side of said second trim valve, means for manually adjusting one side with respect to said other side of said first trim valve to vary the extent of connection from said source to each of said individual fluid lines to said land/air valve to maintain the trainer in a fixed attitude in operation, means for attaching said one side of said second trim valve to said fixed base whereby said second trim valve does not vary the extent of connection from said source to each of said individual fluid lines, and means for mechanically connecting said land-air valve to said solenoid so that energization of said solenoid places said land/air valve into its second position, whereby energization of said solenoid effectively ensures the equal application of fluid pressure variations from said source to all of said expansible motors to automatically level said trainer.

2. The trainer defined in claim 1 wherein said land/air valve comprises a pair of solid cylinders, means for mounting one of said cylinders for rotation with respect to the other of said cylinders, said one cylinder having a first number of longitudinal perforations generally equally spaced, said other cylinder having a second number of longitudinal perforations therethrough, said second number being twice said first number, said perforations being so arranged that in a first rotational position said first number of perforations are aligned with one half of said second number of perforations and in a second rotational position said first number of perforations are aligned with the other half of said second number of perforations, means for connecting individual ones of said first number of perforations to individual expansible motors, means for connecting said one half of said second perforations to said individual fluid lines connected to said first trim valve, and means for connecting the other half of said second perforations to said individual fluid lines connected to said second trim valve.

3. The trainer defined in claim 2 further including simulated rate-of-climb indicator, a simulated air-speed indicator, and simulated toe brakes, means for connecting said relay to said rate-of-climb indicator to adjust said rate-of-climb indicator to zero when said relay is operated, and means connecting said toe brakes and said relay to said air-speed indicator to adjust said air-speed indicator to zero when said relay and said toe brakes are operated.

References Cited

UNITED STATES PATENTS

| | | | |
|---|---|---|---|
| 2,485,499 | 10/1949 | Lewis | 35—12 |
| 2,510,500 | 6/1950 | Hayes et al. | 35—12 |
| 2,514,762 | 7/1950 | Hayes et al. | 35—12 |

EUGENE R. CAPOZIO, *Primary Examiner.*

PAUL V. WILLIAMS, *Assistant Examiner.*